United States Patent
Klinkert et al.

(10) Patent No.: US 12,442,811 B2
(45) Date of Patent: Oct. 14, 2025

(54) ANALYSIS OF A GAS DISSOLVED IN AN INSULATING MEDIUM OF A HIGH-VOLTAGE DEVICE

(71) Applicant: Maschinenfabrik Reinhausen GmbH, Regensburg (DE)

(72) Inventors: Marcell Klinkert, Mainz (DE); Patrick Ruoff, Karlsruhe (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 749 days.

(21) Appl. No.: 17/272,679

(22) PCT Filed: Sep. 4, 2019

(86) PCT No.: PCT/EP2019/073589
§ 371 (c)(1),
(2) Date: Mar. 2, 2021

(87) PCT Pub. No.: WO2020/049049
PCT Pub. Date: Mar. 12, 2020

(65) Prior Publication Data
US 2021/0341456 A1    Nov. 4, 2021

(30) Foreign Application Priority Data
Sep. 5, 2018 (DE) .................. 10 2018 121 647.5

(51) Int. Cl.
*G01N 33/28* (2006.01)
*G01N 1/22* (2006.01)

(52) U.S. Cl.
CPC ....... *G01N 33/2841* (2013.01); *G01N 1/2226* (2013.01); *G01N 2001/2241* (2013.01)

(58) Field of Classification Search
CPC .................................................. G01N 33/2841
See application file for complete search history.

(56) References Cited

U.S. PATENT DOCUMENTS

| 5,659,126 A | 8/1997 | Farber |
| 6,037,592 A | 3/2000 | Sunshine et al. |
| 6,421,588 B1 | 7/2002 | Janata |

FOREIGN PATENT DOCUMENTS

| CN | 103926299 A | 7/2014 |
| JP | S62188969 | * 8/1987 |

(Continued)

OTHER PUBLICATIONS

Belanger, et al., "Laboratory Testing of a Sensor for Hydrogen Dissolved in Transformer Oil," *IEEE Transaction on Electrical Insulation*, El-1, 2, p. 144-148, Apr. 1980, IEEE, New York, US.

(Continued)

*Primary Examiner* — John E Breene
*Assistant Examiner* — Alex T Devito
(74) *Attorney, Agent, or Firm* — LEYDIG, VOIT & MAYER, LTD.

(57) ABSTRACT

A method analyses a gas dissolved in an insulating medium of a high-voltage device. The method includes: transferring the dissolved gas by an analysis device into a gas phase to obtain an analysis gas mixture; transporting the analysis gas mixture to an analysis sensor of the analysis device; generating a sensor signal as an output signal of the analysis sensor as a function of a composition of the analysis gas mixture; determining a first intermediate value based on the sensor signal and at least one disturbance value; determining a second intermediate value based on the first intermediate value and at least one specific value of the analysis device; and determining a value for a concentration of the dissolved gas in the insulating medium based on the second intermediate value.

22 Claims, 1 Drawing Sheet

(56) References Cited

FOREIGN PATENT DOCUMENTS

| | | | | |
|---|---|---|---|---|
| JP | 2004093241 | * | 3/2004 | |
| KR | 101761838 B1 | | 7/2017 | |
| WO | WO-0162306 A2 | * | 8/2001 | ............... A61L 9/22 |
| WO | 2011086479 A1 | | 7/2011 | |

OTHER PUBLICATIONS

Tsukioka, et al., "New Apparatus for Detecting H2, Co, and CH4 Dissolved in Transformer Oil," *IEEE Transactions on Electrical Insulation*, El-1, 4, p. 409-419, Aug. 1983, IEEE, New York, US.

* cited by examiner

ANALYSIS OF A GAS DISSOLVED IN AN INSULATING MEDIUM OF A HIGH-VOLTAGE DEVICE

CROSS-REFERENCE TO PRIOR APPLICATIONS

This application is a U.S. National Phase Application under 35 U.S.C. § 371 of International Application No. PCT/EP2019/073589, filed on Sep. 4, 2019, and claims benefit to German Patent Application No. DE 10 2018 121 647.5, filed on Sep. 5, 2018. The International Application was published in German on Mar. 12, 2020 as WO 2020/049049 under PCT Article 21(2).

FIELD

The present invention relates to a method and an analysis device for analysing a gas dissolved in an insulating medium of a high-voltage device.

BACKGROUND

The concentration of specific dissolved gases in an insulating medium, for example an insulating oil, a high-voltage device, for example a transformer or a tap changer, can be used as an indicator of a malfunction or imminent malfunctions of the high-voltage device. In this context, for example, hydrogen and carbon monoxide are relevant and can indicate electrical faults or faults in the insulation materials. An analysis of the gas concentration in the insulating medium, in particular long-term online monitoring, enables the early detection of potentially problematic developments.

Existing methods or devices for analysing dissolved gases in the insulating medium of a high-voltage device do not take into account material-determined product or production variations, for example; and therefore, only achieve limited accuracy.

SUMMARY

An embodiment of the present invention provides a method that analyses a gas dissolved in an insulating medium of a high-voltage device. The method includes: transferring the dissolved gas by an analysis device into a gas phase to obtain an analysis gas mixture; transporting the analysis gas mixture to an analysis sensor of the analysis device; generating a sensor signal as an output signal of the analysis sensor as a function of a composition of the analysis gas mixture; determining a first intermediate value based on the sensor signal and at least one disturbance value; determining a second intermediate value based on the first intermediate value and at least one specific value of the analysis device; and determining a value for a concentration of the dissolved gas in the insulating medium based on the second intermediate value.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
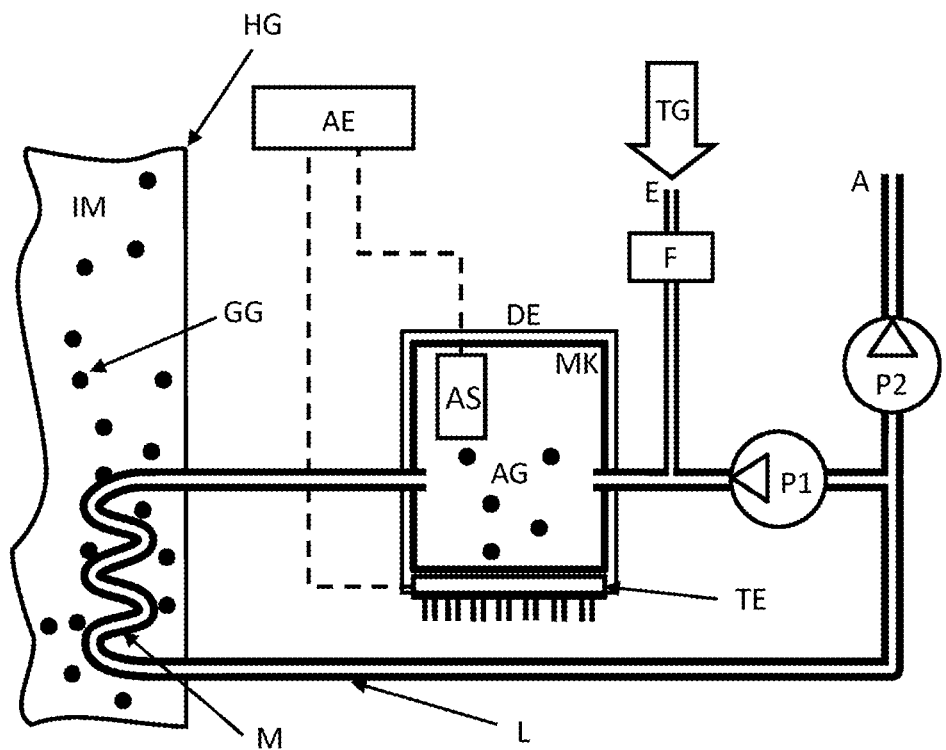
FIG. 1 is a schematic structure of an example embodiment of an analysis device according to the present invention.

Embodiments of the present invention provide an improved concept for analysing a gas dissolved in an insulating medium of a high-voltage device, which results in improved accuracy of the analysis.

The improved concept leverages the idea of implementing a multistep method for evaluating a sensor signal and the individual steps taking into account different influences of the device and the environment on a sensor signal. The individual steps are thereby independent of one another. In this way, device-specific behaviours can be differentiated and compensated.

According to the improved concept, a method is provided for analysing a gas dissolved in an insulating medium of a high-voltage device. Here the dissolved gas is transferred by means of an analysis device, in particular a separation unit of an analysis device, into a gas phase, in order to obtain an analysis gas mixture. The analysis gas mixture is transported to an analysis sensor of the analysis device. A sensor signal is generated as an output signal of the analysis sensor as a function of a composition of the analysis gas mixture, in particular a concentration of the gas transferred into the gas phase in the analysis gas mixture. Based on the sensor signal and at least one disturbance value a first intermediate value is generated. A second intermediate value is determined based on the first intermediate value and at least one specific value of the analysis device. A value for a concentration of the dissolved gas in the insulating medium is determined based on the second intermediate value.

The analysis gas mixture can also contain a carrier gas, for example air, apart from the gas transferred to the gas phase. The carrier gas can be introduced into the analysis device by means of a pump device for example.

The at least one disturbance value here reflects for example external influences and states, which in particular do not derive from product variations for example of the analysis sensor or other components of the analysis device.

In comparison, the at least one specific value of the analysis device reflects properties of the analysis device itself, for example as a result of product or production variations, in particular material-determined variations. In particular, the at least one specific value of the analysis device is independent of external influences or states.

The separate consideration of the at least one disturbance value and the at least one specific value of the analysis device allows a differentiated consideration of the properties of the analysis device, for example during the modelling of the gas concentration in the insulating medium.

According to at least one embodiment, the insulating medium is an insulating fluid, in particular insulating oil, for example a transformer oil, or an alternative insulating fluid, such as for example a synthetic ester.

According to at least one embodiment, the high-voltage device is a transformer, in particular a power transformer, a choke or a tap changer, for example an on-load tap-changer, for switching between different winding taps of a transformer or a choke.

According to at least one embodiment, the dissolved gas contains hydrogen or carbon monoxide.

According to at least one embodiment, the at least one specific value of the analysis device influences the transfer of the dissolved gas into the gas phase.

In particular, then a concentration of the gas in the gas phase inside the analysis device is dependent on a concentration of the dissolved gas in the insulating medium and on the at least one specific value of the analysis device.

According to at least one embodiment, the at least one specific value of the analysis device influences a behaviour of the analysis sensor, in particular the generation of the output signal.

In particular, then the sensor signal is dependent on a concentration of the dissolved gas in the insulating medium and on the at least one specific value of the analysis device.

According to at least one embodiment, the transfer of the dissolved gas into the gas phase is performed by means of a semipermeable membrane of the analysis device, in particular the separation unit. The at least one specific value of the analysis device comprises a property of the membrane, in particular a porosity of the membrane.

According to at least one embodiment, the at least one specific value of the analysis device comprises a property of the analysis sensor, in particular a sensitivity of the analysis sensor, a response time of the analysis sensor or reaction time of the analysis sensor.

According to at least one embodiment, the at least one disturbance value influences a behaviour of the analysis sensor. In particular, the output signal is dependent on an input signal of the analysis sensor and on the at least one disturbance value.

According to at least one embodiment, the at least one disturbance value comprises a temperature of an environment of the analysis sensor, a pressure of this environment and/or a moisture content of this environment. The environment can be in particular the inside of a detection unit of the analysis device, in which the analysis sensor is arranged.

According to at least one embodiment, the method comprises flushing the analysis device with a flushing gas and determining a flushing result, in particular a quality or a level of success of the flushing. Then the at least one disturbance value can comprise a value for determining the flushing result.

According to at least one embodiment, the determination of the value for the concentration is performed additionally based on at least one further disturbance value.

According to at least one embodiment, the at least one further disturbance value influences the transfer of the dissolved gas into the gas phase. In particular, then a concentration of the gas in the gas phase inside the analysis device is dependent on a concentration of the dissolved gas in the insulating medium and on the at least one further disturbance value.

According to at least one embodiment, the at least one further disturbance value comprises a temperature of the insulating medium, a moisture content of the insulating medium and/or a pressure of the insulating medium and/or a flow speed of the insulating medium.

According to at least one embodiment, the second intermediate value is determined additionally based on a specific value of the insulating medium. This relates to a material parameter of the insulating medium. The latter can possibly be dependent on environmental conditions, but does not represent one itself.

According to at least one embodiment, the specific value of the insulating medium influences the transfer of the dissolved gas into the gas phase.

According to at least one embodiment, the specific value of the insulating medium comprises a solubility of the dissolved gas in the insulating medium.

According to at least one embodiment, the first intermediate value is determined based on a first model, in particular regression model. The second intermediate value is based on a second model, in particular regression model. The value for the concentration of the dissolved gas is determined based on a third model, in particular regression model. Here the three models are independent of one another which allows a dedicated consideration and compensation of the disturbance values, further disturbance values and/or specific values of the analysis device and thus results in better accuracy.

According to the improved concept, also an analysis device is provided for analysing a gas dissolved in an insulating medium of a high-voltage device. In particular, the analysis device is suitable for performing a method according to the improved concept.

The analysis device comprises a separation unit, an analysis sensor, a pump device and an evaluation unit. The separation unit is configured to transfer the dissolved gas into a gas phase in order to obtain an analysis gas mixture. The pump device is configured to transport the analysis gas mixture from the separation unit to the analysis sensor. The analysis sensor is configured to generate a sensor signal output signal dependent on a composition of the analysis gas mixture.

The evaluation unit is configured to determine a first intermediate value based on the sensor signal and at least one disturbance value and a second intermediate value based on the first intermediate value and at least one specific value of the analysis device. In addition, the evaluation unit is configured to determine a value for a concentration of the dissolved gas in the insulating medium based on the second intermediate value.

According to at least one embodiment of the analysis device, the separation unit comprises a semipermeable membrane, through which the dissolved gas can pass from the high-voltage device into the analysis device.

According to at least one embodiment, the analysis sensor comprises a metal-oxide-semiconductor-field-effect transistor, MOSFET.

According to at least one embodiment, the sensor signal is dependent on a resistance, in particular a source-drain resistance, of the MOSFET. In particular, the greater the concentration of gas in the analysis gas mixture, the lower the resistance.

According to at least one embodiment, the sensor signal is dependent on a resistance of the MOSFET after a saturation period. Here the saturation period corresponds for example to a time period between the end of the flushing and a time point at which the value of the resistance no longer changes significantly.

The MOSFET, or a further MOSFET, can also be used for example to determine or evaluate the result of the flushing.

According to at least one embodiment, the evaluation unit comprises a processor unit and a measuring device for determining a temperature of the processor unit. The evaluation unit is configured to determine a temperature in an environment of the analysis sensor, for example within the detection unit, based on the temperature of the processor unit. In addition, the processor unit can be located for example suitably close to the analysis sensor.

In this case, an additional temperature sensor does not need to be provided in the detection unit in order to determine the temperature of the environment of the analysis sensor.

According to at least one embodiment, the evaluation unit is configured to determine the temperature in the environment of the analysis sensor based on the temperature of the processor unit and on further influencing factors, in particular further heat sources, for example relays or insulating medium.

Further embodiments and implementations of the analysis device according to the improved concept result directly from the different embodiments of the method according to the improved concept and vice versa.

In the following, the invention is described by way of example embodiments with reference to the drawings.

Figure 2:
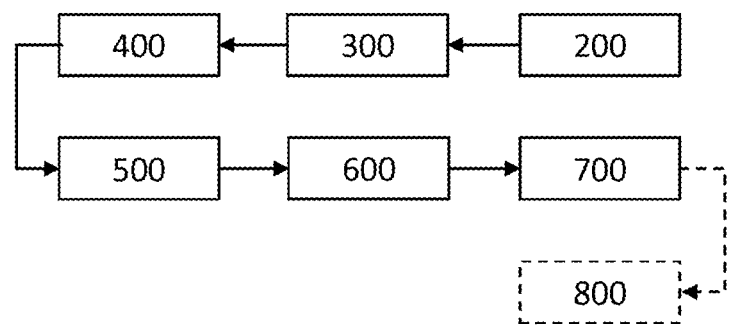
FIG. 2 is a flowchart of an example embodiment of a method according to the present invention.

FIG. 1 shows a schematic structure of an example embodiment of an analysis device according to the improved concept. FIG. 2 shows an associated flowchart of an example embodiment of a method according to the improved concept.

FIG. 1 shows a high-voltage device HG, such as a power transformer or an on-load tap-changer, with a tank or vessel, which is filled at least partly with an insulating medium IM, for example transformer oil. Different gases may be present dissolved in the insulating medium. In the following, the discussion is limited to a specific dissolved gas GG, for example hydrogen or carbon monoxide. The analysis device can however analyse a plurality of different gases in different embodiments, in particular hydrogen and carbon monoxide. The following explanations are therefore applicable by analogy to different gases.

The analysis device comprises a separation unit, which is in direct contact with the insulating medium. In addition, the separation unit can be guided at least partly by corresponding feedthroughs of the high-voltage device into the interior thereof. In the shown example, the separation unit comprises a semipermeable membrane M.

The analysis device comprises a detection unit DE, which has a measuring chamber MK for example. In the interior of the detection unit DE, in particular the measuring chamber MK an analysis sensor AS is arranged.

In addition, the analysis device comprises an inlet E for a carrier gas TG, a gas outlet A, and optionally a filter F for filtering the carrier gas TG flowing through the inlet E.

The analysis device comprises a pump device, which comprises a first pump P1 and a second pump P2 for example.

The analysis device comprises a pipe system L, which connects the separation unit, if necessary the membrane M, the detection unit DE, in particular the measuring chamber MK, the inlet E, the outlet A and the pump device.

Optionally, the detection device DE comprises a temperature control device TE, for example a Peltier element, for controlling the temperature inside the detection device DE, in particular the measuring chamber MK and the environment of the analysis sensor AS.

Optionally the detection device DE comprises a pressure sensor for determining the interior of the detection device DE, in particular the measuring chamber MK and the environment of the analysis sensor AS.

The analysis device comprises an evaluation unit AE, which is coupled to the analysis sensor AS.

If necessary, the evaluation unit AE for controlling the temperature control device TE can be coupled to the latter, if provided. Alternatively, a separate control unit can be provided for controlling the temperature control device TE. In this case, the control unit can also be used for controlling the pump device.

In operation of the analysis device in step 200 of FIG. 2 the dissolved gas GG can pass through the membrane M into the inside of the analysis device, in particular into the pipe system L, where it is then in the gas phase. The liquid insulating medium IM cannot pass through the membrane M however. In addition, the pump device can transport the carrier gas TG into the pipe system, so that it forms an analysis gas mixture AG with the gas, which has passed through the membrane M.

This process of diffusion can be driven by a concentration difference or a chemical potential. For example, a dynamic equilibrium is formed at the membrane M relative to the gas concentration. This equilibrium is dependent for example on the temperature of the insulating medium IM, the concentration of the dissolved gas GG in the insulating medium IM and/or the solubility of the gas in the insulating medium IM.

With increasing temperature, the processing speed increases. The level of the state of equilibrium can be influenced thereby. By means of the gas, concentration in the insulating medium IM the concentration gradient is changed. Here the gas concentration in the insulating medium IM can be locally variable. Thus, with non-existent convection of the insulating medium IM a depletion zone of dissolved gas GG can be formed around the membrane M. A convection supports a surface renewal of the gases at the membrane M. The solubility of the gas GG in the insulating medium IM is dependent on the total amount of dissolved substances in the insulating medium M. Thus, for example a proportion of free water in the insulating medium M influences how well hydrogen can be dissolved.

As an alternative to the membrane M, the separation unit can comprise other devices, which can bring about the separation of the dissolved gas GG from the insulating medium IM. For example, the separation can be performed by means of the vacuum method or the headspace method. The latter two methods are known to the person skilled in the art.

The analysis gas mixture AG is transported in step 300 by means of the pump device into the interior of the detection unit DE and thus to the analysis sensor AS.

In step 400 by means of the analysis sensor AS a sensor signal is generated, which corresponds for example to a saturation value of a resistance of the analysis sensor AS. The sensor signal is here dependent on a concentration of the gas to be analysed in the analysis gas mixture AG and thus on the concentration of the dissolved gas GG in the insulating medium.

Optionally, before generating the sensor signal, the pipe system L and the detection unit DE, in particular the measuring chamber MK, can be flushed by means of the pump device with carrier gas TG. In this way, it can be achieved that the analysis gas mixture AG consists firstly essentially of carrier gas TG and after flushing the concentration of the gas to be analysed increases to a state of equilibrium. In this way, the sensor signal can be normalised, in that it corresponds for example to the difference between the output signal of the analysis sensor AS directly after flushing and after reaching the equilibrium or saturation.

The sensor signal is detected by the evaluation unit AE. In step 500, the evaluation unit AE determines a first intermediate value based on the sensor signal and at least one disturbance value, which for example influences a behaviour of the analysis sensor AS. The at least one disturbance value can include for example a temperature, a pressure or a moisture content inside the detection unit DE or the measuring chamber MK. The at least one disturbance value can be determined for example in step 400 by the evaluation unit AE. For this purpose, the analysis device can comprise further sensors for determining the at least one disturbance value, which are coupled to the evaluation unit AE. To determine the first intermediate value for example a first regression model can be used.

The evaluation unit AE then determines in step 600 a second intermediate value based on the first intermediate value and at least one specific variable of the analysis device, which influences the transfer of the dissolved gas GG into the gas phase and/or a behaviour of the analysis sensor AS. In the first case the at least one specific value of the analysis device can comprise a property of the separation unit, for example the membrane M, for example a porosity of the membrane M. In the second case, the at least one specific value of the analysis device can comprise a property of the analysis sensor AS, for example a sensitivity of the analysis sensor AS. The at least one specific value of the analysis device can be determined during the method according to the improved concept or before the initial operation of the analysis device. Thus, for example material-dependent or process-dependent product variations can be differentiated and compensated. For determining the second intermediate value for example a second regression model can be used.

In step 700, the evaluation unit AE based on the second intermediate value and optionally additionally based on at least one further disturbance value determines a value for a concentration of the dissolved gas GG in the insulating medium IM. The at least one further disturbance value thereby influences the transfer of the dissolved gas GG to the gas phase. The at least one further disturbance value can contain for example a temperature, a moisture content and/or a flow speed of the insulating medium IM. It can be detected for example in step 200 by the evaluation unit AE. In addition, the analysis device or the high-voltage device HG can comprise additional sensors for determining the at least one further disturbance value, which are coupled to the evaluation unit AE. For determining the value for the concentration for example a third regression model can be used.

In an optional step 800 the evaluation unit AE based on the value for the concentration can generate an instruction or information, for example a warning signal or the like.

By means of a method or an analysis device according to the improved concept the analysis of a gas dissolved in an insulating medium of a high-voltage device can be performed in the described manner with improved analysis precision.

The separation of the analysis into independent steps also makes it possible to use a linearized model for calibrating the analysis device in production. The model can be configured for example by a simple two-point calibration specific to the device. In the field a one-point adjustment can be used in the field, (for example degenerated insulating oil has different gas solubility than fresh insulating oil).

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

HG high-voltage device
IM insulating medium
GG dissolved gas
M semipermeable membrane
L pipe system
AE evaluation unit
DE detection unit
MK measuring chamber
AS analysis sensor
AG analysis gas mixture
TE temperature control device
P1, P2 pumps
E inlet
A outlet
TG carrier gas
F filter

The invention claimed is:

1. A method for analysing a gas dissolved in an insulating medium of a high-voltage device, the method comprising:
   transferring the dissolved gas by an analysis device into a gas phase to obtain an analysis gas mixture;
   transporting the analysis gas mixture to an analysis sensor of the analysis device;
   generating a sensor signal as an output signal of the analysis sensor as a function of a composition of the analysis gas mixture, wherein the composition of the analysis gas mixture corresponds to a concentration of a gas converted into a gas phase in the analysis gas mixture;
   determining a first intermediate value based on the sensor signal, which depends on the concentration of the gas converted into the gas phase in the analysis gas mixture, and a first disturbance value and a second disturbance value based on a first regression model, where the first intermediate value is a concentration of the gas converted into the gas phase influenced by the first disturbance value and the second disturbance value, and the first disturbance value comprises a temperature and a moisture content of an environment of the analysis sensor and the second disturbance value comprise a flow velocity of the insulating medium;

determining a second intermediate value based on the first intermediate value and at least one specific value of the analysis device using a second regression model, wherein the at least one specific value of the analysis device comprises a property of the analysis sensor or the analysis device; and determining a value for a concentration of the dissolved gas in the insulating medium based on the second intermediate value.

2. The method according to claim 1, wherein the at least one specific value of the analysis device influences the transfer of the dissolved gas into the gas phase or a behaviour of the analysis sensor.

3. The method according to claim 1, wherein the transfer of the dissolved gas into the gas phase is performed by a semipermeable membrane of the analysis device and the at least one specific value of the analysis device comprises a property of the membrane.

4. The method according to claim 3, wherein the property of the membrane comprises a porosity of the membrane.

5. The method according to claim 1, wherein the at least one disturbance value influences a behaviour of the analysis sensor.

6. The method according to claim 1, wherein the determination of the second intermediate value is performed additionally based on a specific value of the insulating medium.

7. The method according to claim 6, wherein the specific value of the insulating medium influences the transfer of the dissolved gas into the gas phase.

8. The method according to claim 6, wherein the specific value of the insulating medium comprises a solubility of the dissolved gas in the insulating medium.

9. The analysis device according to claim 6, wherein the specific value of the insulating medium comprises a solubility of the dissolved gas in the insulating medium.

10. The method according to claim 1, wherein the property of the analysis sensor comprises a response time or reaction time of the analysis sensor.

11. An analysis device for analysing a gas dissolved in an insulating medium of a high-voltage device, the analysis device comprising:

a separator configured to transfer the dissolved gas into a gas phase to obtain an analysis gas mixture;

an analysis sensor configured to generate a sensor signal output signal as a function of a composition of the analysis gas mixture, wherein the composition of the analysis gas mixture corresponds to a concentration of a gas converted into a gas phase in the analysis gas mixture;

a pump configured to transport the analysis gas mixture from the separator to the analysis sensor; and an evaluator, which is configured:

to determine a first intermediate value based on the sensor signal, which depends on the concentration of the gas converted into the gas phase in the analysis gas mixture, and a disturbance value and a second disturbance value based on a first regression model, where the first intermediate value is a concentration of the gas converted into the gas phase influenced by the first disturbance value and the second disturbance value, and the first disturbance value comprises a temperature and a moisture content of an environment of the analysis sensor and the second disturbance value comprise a flow velocity of the insulating medium;

to determine a second intermediate value based on the first intermediate value and at least one specific value of the analysis device using a second regression model, wherein the at least one specific value of the analysis device comprises a property of the analysis sensor or the analysis device; and to determine a value for a concentration of the dissolved gas in the insulating medium based on the second intermediate value.

12. The analysis device according to claim 11, wherein the separator comprises a semipermeable membrane, through which the dissolved gas can pass from the high-voltage device into the analysis device.

13. An analysis device for analysing a gas dissolved in an insulating medium of a high-voltage device, the analysis device comprising:

a separator configured to transfer the dissolved gas into a gas phase to obtain an analysis gas mixture;

an analysis sensor configured to generate a sensor signal output signal as a function of a composition of the analysis gas mixture;

a pump configured to transport the analysis gas mixture from the separator to the analysis sensor; and an evaluator, which is configured:

to determine a first intermediate value based on the sensor signal and at least one disturbance value;

to determine a second intermediate value based on the first intermediate value and at least one specific value of the analysis device; and to determine a value for a concentration of the dissolved gas in the insulating medium based on the second intermediate value, wherein the evaluator:

comprises a processor and a measuring device configured to determine a temperature of the processor; and is configured to determine a temperature in an environment of the analysis sensor based on the temperature of the processor.

14. The analysis device according to claim 13, wherein the separator comprises a semipermeable membrane, through which the dissolved gas can pass from the high-voltage device into the analysis device.

15. The analysis device according to claim 14, wherein the at least one specific value of the analysis device comprises a property of the semipermeable membrane.

16. The analysis device according to claim 15, wherein the property of the semipermeable membrane comprises a porosity of the semipermeable membrane or wherein the at least one specific value comprises a property of the analysis sensor, which comprises a response time or reaction time of the analysis sensor.

17. The analysis device according to claim 13, wherein the at least one specific value of the analysis device influences the transfer of the dissolved gas into the gas phase or a behaviour of the analysis sensor.

18. The analysis device according to claim 13, wherein the at least one disturbance value influences a behaviour of the analysis sensor.

19. The analysis device according to claim 13, wherein the determination of the second intermediate value is configured to be performed additionally based on a specific value of the insulating medium.

20. The analysis device according to claim 19, wherein the specific value of the insulating medium influences the transfer of the dissolved gas into the gas phase.

21. A method for determining a concentration of a gas that is dissolved in a liquid insulating medium for a transformer, a choke, or a tap-changer, the method comprising:
- receiving an analysis gas mixture at an analysis sensor, the analysis gas mixture comprising a portion of the gas that was dissolved in the insulating medium after having been converted into a gas phase by passing through a semipermeable membrane of an analysis device that is in fluid communication with the liquid insulating medium comprising the dissolved gas;
- generating a sensor signal as an output signal of the analysis sensor as a function of a composition of the analysis gas mixture, wherein the composition of the analysis gas mixture corresponds to the concentration of the gas converted into the gas phase in the analysis gas mixture;
- determining a first intermediate value based on the sensor signal, which depends on the concentration of the gas converted into the gas phase in the analysis gas mixture, and a first disturbance value and a second disturbance value based on a first regression model, where the first intermediate value is a concentration of the gas converted into the gas phase influenced by the first disturbance value and the second disturbance value, and the first disturbance value comprises a temperature and a moisture content of an environment of the analysis sensor and the second disturbance value comprise a flow velocity of the insulating medium;
- determining a second intermediate value based on the first intermediate value and at least one specific value of the analysis device using a second regression model, wherein the at least one specific value of the analysis device comprises a property of the analysis sensor or the analysis device; and
- determining a value for the concentration of the gas that is dissolved in the liquid insulating medium based on the second intermediate value.

22. The method of claim 21, wherein an evaluator, comprising a processor, is configured to:
- perform the determining of the first intermediate value, the determining of the second intermediate value, and the determining of the value for the concentration of the gas dissolved in the liquid insulating medium,
- determine a temperature of the processor, and
- determine a temperature in an environment of the analysis sensor based on the temperature of the processor.

* * * * *